United States Patent
Schaude

(10) Patent No.: US 12,505,236 B2
(45) Date of Patent: Dec. 23, 2025

(54) ENABLING ACCESS CONTROL FOR ARCHIVED OBJECTS

(71) Applicant: SAP SE, Walldorf (DE)

(72) Inventor: Horst Schaude, Kraichtal (DE)

(73) Assignee: SAP SE, Walldorf (DE)

( * ) Notice: Subject to any disclaimer, the term of this patent is extended or adjusted under 35 U.S.C. 154(b) by 151 days.

(21) Appl. No.: 18/381,821

(22) Filed: Oct. 19, 2023

(65) Prior Publication Data

US 2025/0131109 A1   Apr. 24, 2025

(51) Int. Cl.
  *G06F 21/60* (2013.01)
  *G06F 21/31* (2013.01)
  *G06F 21/62* (2013.01)

(52) U.S. Cl.
  CPC ............ *G06F 21/604* (2013.01); *G06F 21/31* (2013.01); *G06F 21/6209* (2013.01)

(58) Field of Classification Search
  None
  See application file for complete search history.

(56) References Cited

U.S. PATENT DOCUMENTS

| | | | |
|---|---|---|---|
| 10,084,794 B2 * | 9/2018 | Goldfarb | H04L 63/08 |
| 2008/0162619 A1 * | 7/2008 | Schulz | H04L 67/34 |
| | | | 709/201 |
| 2010/0149570 A1 * | 6/2010 | Kamiya | G06F 21/10 |
| | | | 358/1.14 |
| 2012/0198019 A1 * | 8/2012 | Thomas | G06F 16/972 |
| | | | 709/217 |
| 2015/0006489 A1 * | 1/2015 | Fabijancic | G06F 16/22 |
| | | | 707/661 |
| 2016/0285835 A1 * | 9/2016 | Linga | G06F 21/6218 |

* cited by examiner

*Primary Examiner* — Raqiul A Choudhury
(74) *Attorney, Agent, or Firm* — SCHWEGMAN LUNDBERG & WOESSNER, P.A.

(57) ABSTRACT

A computer-implemented method may comprise: receiving, from a software application, a first request to retrieve archived data from an archive, the first request being associated with a user of the software application; obtaining the archived data in a first format from the archive; transforming the archived data from the first format into a second format; extracting access control data from the archived data in the second format, the access control data defining one or more criteria for accessing the archived data; injecting the access control data into an access management system that is configured to control access to non-archived data; subsequent to the injecting the access control data, sending, to the access management system, a second request to evaluate access rights of the user; and based on the access management system evaluating the access rights of the user, sending the archived data in the second format to the software application.

20 Claims, 5 Drawing Sheets

ENABLING ACCESS CONTROL FOR ARCHIVED OBJECTS

BACKGROUND

Data archiving is the process of moving data that is no longer actively used to a separate storage device for long-term retention. Data may be archived for several reasons, such as for regulatory compliance. Data archives may be indexed and have search capabilities so that archived data can be located and retrieved. Typically, when data is archived, it is persisted in a format that is independent from its original format, such as the format in which it was created and used by a software application. As a result, access control functions cannot be performed directly upon archived data.

An object is a self-contained software entity that comprises data and functions to manipulate data. Data of an object may contain information regarding any personal or private data access restrictions that should be applied to the data. The object format may contain special sections that can be interpreted by an access control framework to determine these data access restrictions. Data that is in a production system is typically available in the format of the object. Therefore, an access control process can be called to verify whether a user has access to the data in the production system. In contrast, archived data is only available in the archive in a special archive format that is not usable for access control purposes. As a result, the access control process cannot check if a user is allowed to access the archived data.

Thus, the archived data is vulnerable to being returned to a user interface framework for display regardless of whether the user has been granted access or not. As a result of this lack of adequate access control, the data security of archived data is negatively affected.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
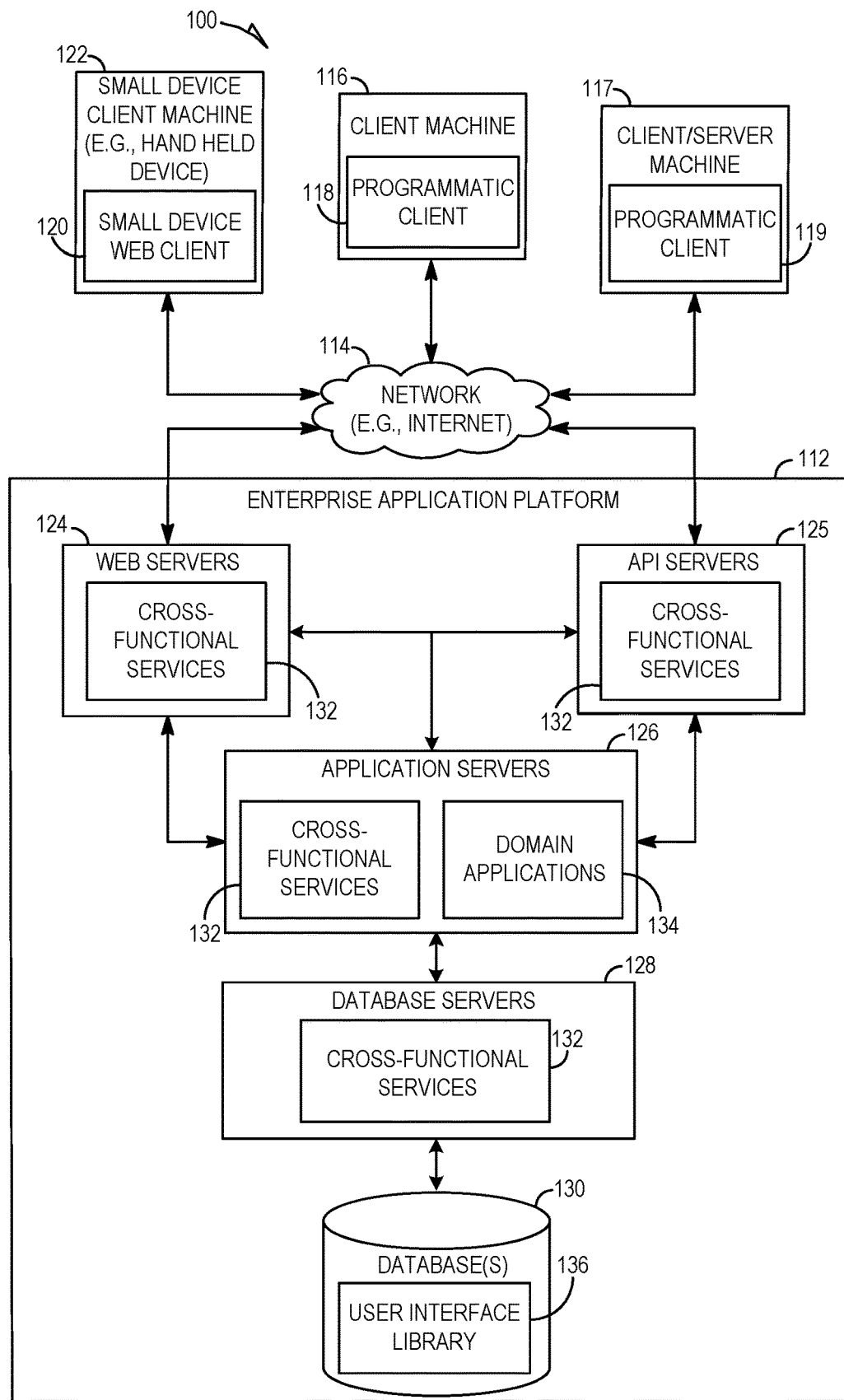
FIG. 1 is an example network diagram illustrating a system.

Example methods and systems of implementing access control for archived objects are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to implement access control for archived objects. In some example embodiments, a computer system may implement effective and efficient access control for archived objects by performing a computer-implemented method comprising receiving, from a software application, a first request to retrieve archived data from an archive, where the first request is associated with a user of the software application, and, in response to the receiving of the first request, obtaining the archived data in a first format from the archive. The computer-implemented method may further comprise transforming the obtained archived data from the first format into a second format, extracting access control data from the archived data in the second format, where the access control data defines one or more criteria for accessing the archived data, and injecting the access control data into an access management system, wherein the access management system being configured to control access to non-archived data. The computer-implemented method may further comprise, subsequent to the injecting the access control data into the access management system, sending, to the access management system, a second request to evaluate access rights of the user of the software application, and, based on the access management system evaluating the access rights of the user of the software application, sending the archived data in the second format to the software application.

The software application may send, to the access management system, a third request to perform a verification of access rights to the archived data for the user of the software application, and receive, from the access management system, a result of the verification of access rights to the archived data for the user of the software application. The software application may then cause a response to the first request to be displayed on a computing device of the user based on the result of the verification of access rights to the archived data for the user.

By transforming the archived data into a format different from the format in which it is archived, extracting the relevant access control data from the transformed archived data, injecting the relevant access control data into the access management system, and sending a request to the access management system to evaluate access rights of the user of the software application the computer system disclosed herein prepares the access management system for the subsequent call by the software application to verify the access rights of the user without exposing the archived data in an unsecure manner. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
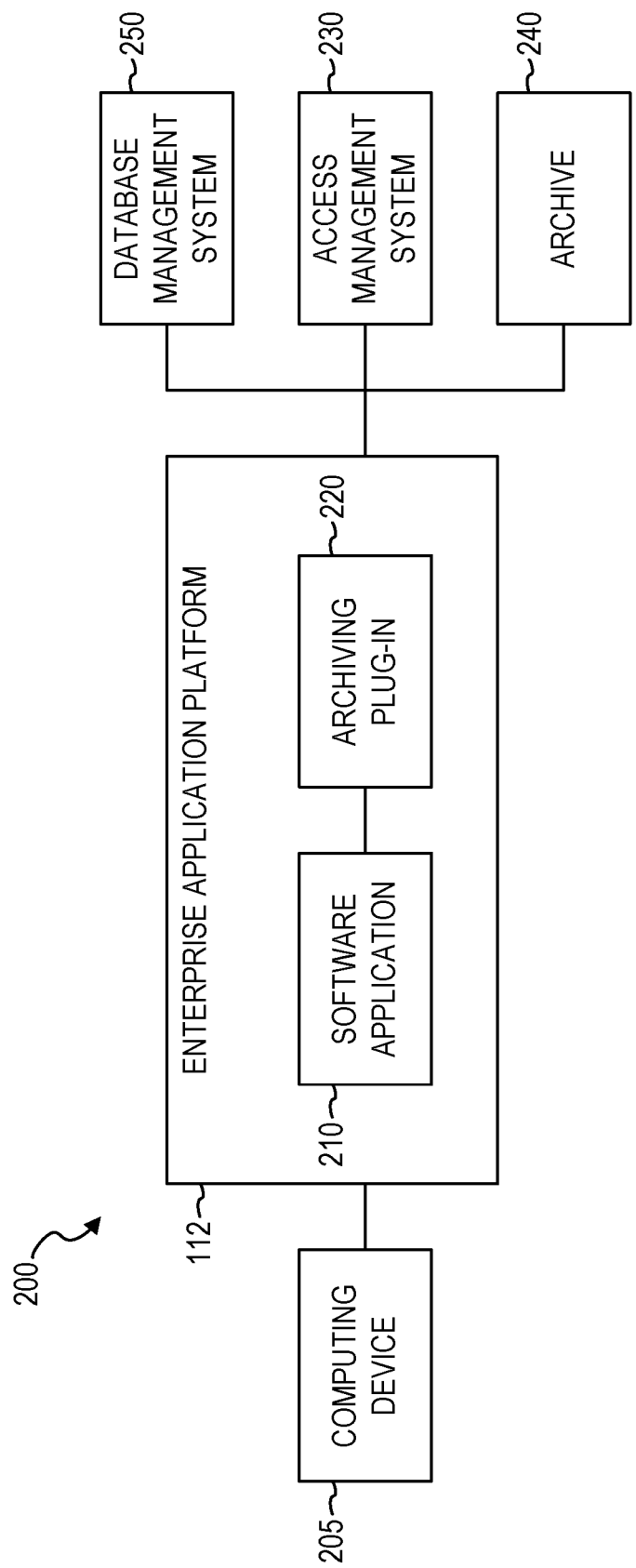
FIG. 2 is a block diagram illustrating an example archive access system.

FIG. 2 is a block diagram illustrating an example archive access system 200. The archive access system 200 may be configured to implement access control for archived objects. In some example embodiments, the archive access system 200 may comprise any combination of one or more of a software application 210, an archiving plug-in 220, an access management system 230, and an archive 240. The components shown in FIG. 2 may be configured to communicate with each other via one or more network connections, such as via the network 114 in FIG. 1. In some example embodiments, one or more of the components of the archive access system 200 may be implemented by the enterprise application platform 112 of FIG. 1. For example, the software application 210 and the archiving plug-in 220 may be incorporated into the enterprise application platform 112. The access management system 230 and the archive 240 may also be incorporated into the enterprise application platform 112, or, alternatively, may be incorporated into a separate computer system.

The software application 210 may comprise an enterprise application. An enterprise application is a large software system platform designed to operate in an organization, such as business or government. Enterprise applications may comprise a group of programs with shared business applications and organizational modeling utilities, and they may be developed using enterprise architecture. Enterprise applications may be configured to provide services including, but not limited to, online shopping and payment processing, interactive product catalogs, computerized billing systems, content management, information technology service management, enterprise resource planning, business intelligence, human resource management, manufacturing, application integration, forms automation, sales force automation, and business process management.

In some example embodiments, the software application 210 may be configured to create objects, such as in response to instructions or input provided by a user of a computing device 205 accessing the software application 210. The objects may comprise entities within a multi-tiered software application that works in conjunction with data access and domain logic layers to transport data. One example of such an object is a business object. A business object may comprise a container for application data, such as a customer or an invoice. Data may be exchanged between software components by business objects. A business object may contain fields that have a name, a type (e.g., a scalar type or another business object), a default value (e.g., for scalar types), and cardinality. Other types of objects are also within the scope of the present disclosure.

The data of objects created via the software application 210 may have an original format. For example, upon creation, the objects may have an Extensible Markup Language (XML) format or a JavaScript® Object Notation (JSON) format. Other types of formats are also within the scope of the present disclosure. The data of these objects may be stored in a database within a database management system 250. In some example embodiments, this data may be archived. For example, the database management system 250, or some other component of the archive access system 200, may move the data from the database of the database management system 250 to the archive 240. The archive 240 may comprise a storage device that is separate from the database of the database management system 250. The archived data may be stored in the archive 240 in a first format that is configured specifically for data archival. For example, the archived data may be stored in a binary large object (BLOB) format. BLOB is a data type that can store binary objects or data. BLOB may comprise a collection of binary data stored as a single entity. Other types of formats may be used for the first format of the archived data.

The archiving plug-in 220 may comprise a plug-in, or some other software component, that provides additional functionality to the software application 210. The archiving plug-in 220 may enable effective and efficient access control to the archive 240. By connecting the archiving plug-in 220 to the software application 210, the access management system 230, and the archive 240, the archive access system 200 provides secure access to users of the software application to the contents of the archive 240.

In some example embodiments, the archiving plug-in 220 may be configured to receive, from the software application 210, a first request to retrieve archived data from an archive 240. The first request may be associated with a user of the software application 210. For example, the user may use the software application 210 to perform a search for data and be presented with matches between the query of the search and one or more entries of data in the archive 240. These matches or hits may be presented as a collection in a hit list. Each hit may be labeled with a measurement or some other indication of the closeness of the match between the query and the corresponding data record. The user may use the software application 210 to select one or more of the data records in the hit list for retrieval from the archive 240. Based on the user selection of the data record(s) in the hit list, the software application 210 may send the first request, to the archiving plug-in 220, to retrieve, from the archive 240, the archived data that corresponds to the user selection.

The archiving plug-in 220 may obtain the archived data in a first format from the archive 240 in response to, or otherwise based on, the receiving of the first request. The archiving plug-in 220 may be configured to transform the obtained archived data from the first format into a second format. For example, the archiving plug-in 220 may convert the archived data from a BLOB format into a corresponding format of the object corresponding to the archived data that was created by the software application 210, such as XML. Other formats of the archived data are also within the scope of the present disclosure.

In some example embodiments, the archiving plug-in 220 may be configured to extract access control data from the archived data in the second format (e.g., from the transformed version of the archived data). Since the second format of the archived data may include one or more fields designated for containing access control data, the archiving plug-in 220 may extract the access control data from these one or more fields. The access control data may define one or more criteria for accessing the archived data. In some example embodiments, the one or more criteria may comprise one or more role-based criteria, such as that the user requesting retrieval of the archived data have a specific role. Role-based access control is based on the concept of roles and privileges. Network access and other resources—such as access to specific files or programs—can be limited by employee. For example, specific files might be read-only, but temporary access can be granted to specific files or programs to complete a task. Organizations can designate whether a user is an end user, administrator, or specialist user. These roles can also overlap or give different permission levels to specific roles. Other types of criteria are also within the scope of the present disclosure.

After extracting the access control data, the archiving plug-in 220 may inject the access control data into the access management system 230. The access management system 230 may be configured to control access to non-archived data. For example, the access management system 230 may be configured to control access to operational or actively-used data stored in a database of the database management system 250. Although injection is a technique that is often used to attack data-driven applications, in which attackers use queries, such as structured query language (SQL) statements, are inserted into an entry field for execution, the archiving plug-in 220 may use this technique for entirely legitimate, legal, and appropriate purposes to prepare the access management system 230 for a subsequent request from the software application 210. The access management system 230 may store the injected access control data in a buffer of the access management system 230, and then send confirmation of its receipt of the access control data to the archiving plug-in 220.

The archiving plug-in 220 may be configured to, subsequent to the injection of the access control data into the access management system 230, send, to the access management system 230, a second request to evaluate access rights of the user of the software application 210. The second request to evaluate access rights of the user of the software application 210 may comprise an identification of the user of the software application 210, as well as a credential of the user. The access management system 230 may evaluate the access rights of the user based on the request using the identification of the user, as well as a credential of the user, along with the access control data in the buffer of the access management system 230. Although the access management system 230 is configured to provide access control for active-used data in the database management system 250, the injection of the access control data into the access management system 230 enables the access management system 230 to perform the evaluation of the access rights of the user requested by the second request.

In some example embodiments, the archiving plug-in 220 may be configured to send the archived data in the second format to the software application 210 based on the access management system 230 evaluating the access rights of the user of the software application 210. For example, the archiving plug-in 220 may send the archived data in the second format to the software application 210 in response to receiving an indication that the access management system 230 has evaluated the access rights of the user, such as in response to receiving a message from the access management system 230 confirming that the evaluation is completed.

The software application 210 may be configured to send, to the access management system 230, a third request to perform a verification of access rights to the archived data for the user of the software application 210. The software application 210 may send the third request to perform the verification of access rights to the access management system 230 in response to, or otherwise based on, receiving the archived data in the second format from the archiving plug-in 220. The third request to perform the verification of access rights for the user may comprise the identification of the user, as well as a credential of the user, which the access management system 230 may use to verify whether the user may access the archived data.

The software application 210 may receive, from the access management system 230, a result of the verification of access rights to the archived data for the user of the software application 210. For example, the result may indicate whether or not the user has permission to access the archived data. The software application 210 may be configured to cause a response to the first request to be displayed on a computing device 205 of the user based on the result of the verification of access rights to the archived data for the user. In some example embodiments, the causing of the response to the first request to be displayed on the computing device 205 of the user may comprise causing the archived data in the second format to be displayed on the computing device 205 of the user in based on the result of the verification of access rights comprising granting the user access to the archived data. In other example embodiments, the causing of the response to the first request to be displayed on the computing device 205 of the user may comprise causing an error message to be displayed on the computing device 205 of the user based on the result of the verification of access rights comprising denying the user access to the archived data.

Figure 3:
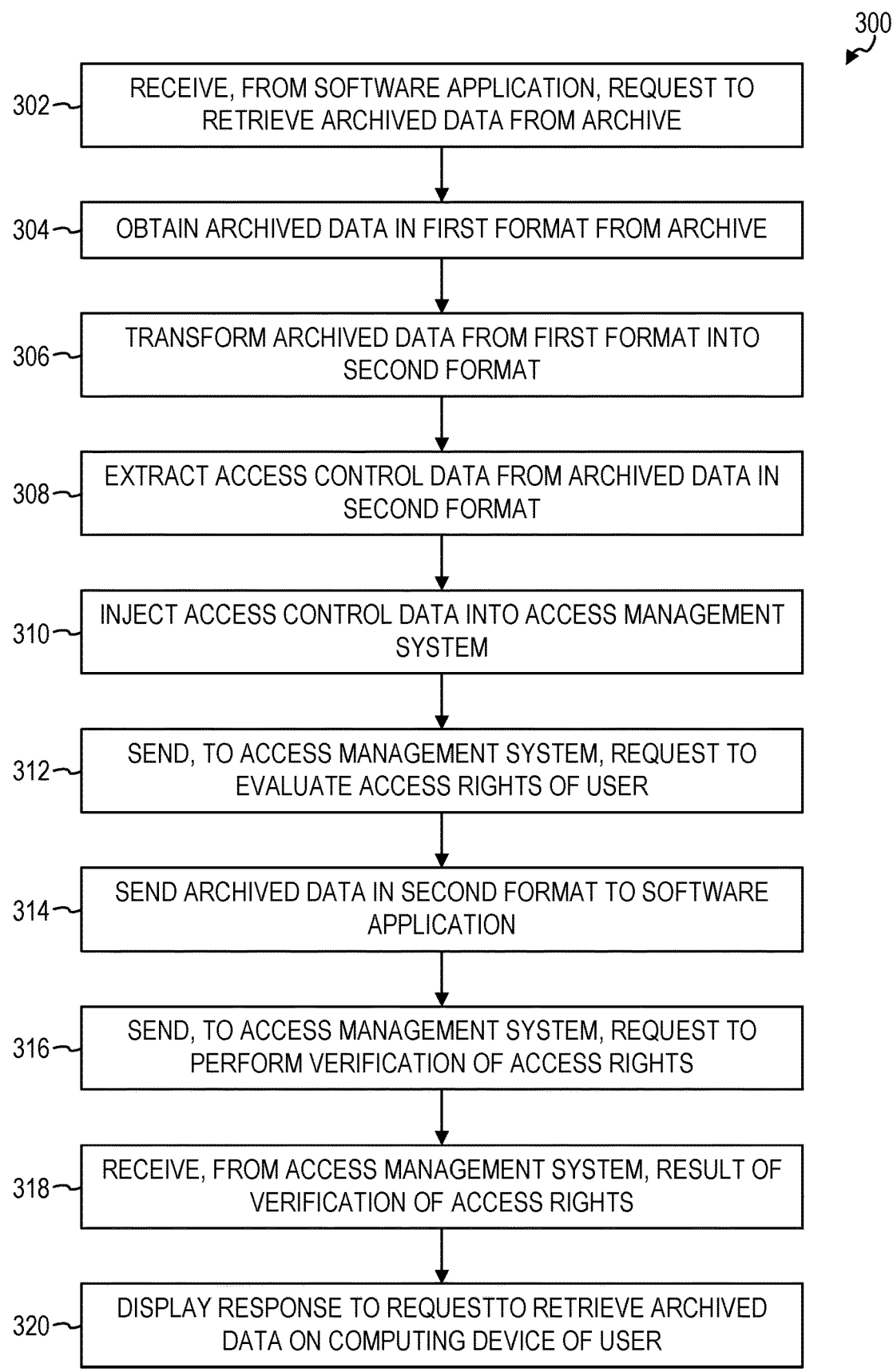
FIG. 3 is a flowchart illustrating an example method of implementing access control for archived objects.

FIG. 3 is a flowchart illustrating an example method 300 of enabling access control for archived objects. The method 300 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 300 are performed by the archive access system 200 of FIG. 2 or any combination of one or more of its components. For example, the operations of the method 300 may be performed by the software application 210 and the archiving plug-in 220.

At operation 302, the archiving plug-in 220 may receive, from the software application 210, a first request to retrieve archived data from an archive 240. The first request may be associated with a user of the software application 210. The software application 210 may comprise an enterprise application. However, other types of software applications 210 are also within the scope of the present disclosure.

Next, the archiving plug-in 220 may, at operation 304, obtain the archived data in a first format from the archive 240 in response to, or otherwise based on, the receiving of the first request. The first format of the archived data may comprise a binary large object (BLOB) format. However, other types of formats may be used for the first format of the archived data.

The archiving plug-in 220 may then transform the obtained archived data from the first format into a second format, at operation 306. The second format of the archived data may comprise a corresponding format of an object created by the software application 210. The object may correspond to the archived data. For example, the object may comprise the data that is archived.

At operation 308, the archiving plug-in 220 may extract access control data from the archived data in the second format. The access control data may define one or more criteria for accessing the archived data. In some example embodiments, the one or more criteria may comprise one or more role-based criteria. However, other types of criteria are also within the scope of the present disclosure.

Next, the archiving plug-in 220 may, at operation 310, inject the access control data into an access management system 230. The access management system 230 may be configured to control access to non-archived data. For example, the access management system 230 may be configured to control access to operational or actively-used data stored in a database of the database management system 250.

The archiving plug-in 220 may then, subsequent to the injecting the access control data into the access management system 230, send, to the access management system 230, a second request to evaluate access rights of the user of the software application 210, at operation 312. The second request to evaluate access rights of the user of the software application 210 may comprise an identification of the user of the software application 210, as well as a credential of the user.

At operation 314, the archiving plug-in 220 may, based on the access management system 230 evaluating the access rights of the user of the software application 210, send the archived data in the second format to the software application 210. For example, the archiving plug-in 220 may send the archived data in the second format to the software application 210 in response to receiving an indication that the access management system 230 has evaluated the access rights of the user, such as in response to receiving a message from the access management system 230 confirming that the evaluation is completed.

Next, the software application 210 may, at operation 316, send, to the access management system 230, a third request to perform a verification of access rights to the archived data for the user of the software application 210. The software application 210 may send the third request to perform the verification of access rights to the access management system 230 in response to, or otherwise based on, receiving the archived data in the second format from the archiving plug-in 220.

The software application 210 may then receive, from the access management system 230, a result of the verification of access rights to the archived data for the user of the software application 210, at operation 318. For example, the result may indicate whether or not the user has permission to access the archived data.

At operation 320, the software application 210 may cause a response to the first request to be displayed on a computing device 205 of the user based on the result of the verification of access rights to the archived data for the user. In some example embodiments, the causing of the response to the first request to be displayed on the computing device 205 of the user may comprise causing the archived data in the second format to be displayed on the computing device 205 of the user based on the result of the verification of access rights comprising granting the user access to the archived data. In other example embodiments, the causing of the response to the first request to be displayed on the computing device 205 of the user may comprise causing an error message to be displayed on the computing device 205 of the user based on the result of the verification of access rights comprising denying the user access to the archived data.

It is contemplated that any of the other features described within the present disclosure can be incorporated into the method 300.

Figure 4:
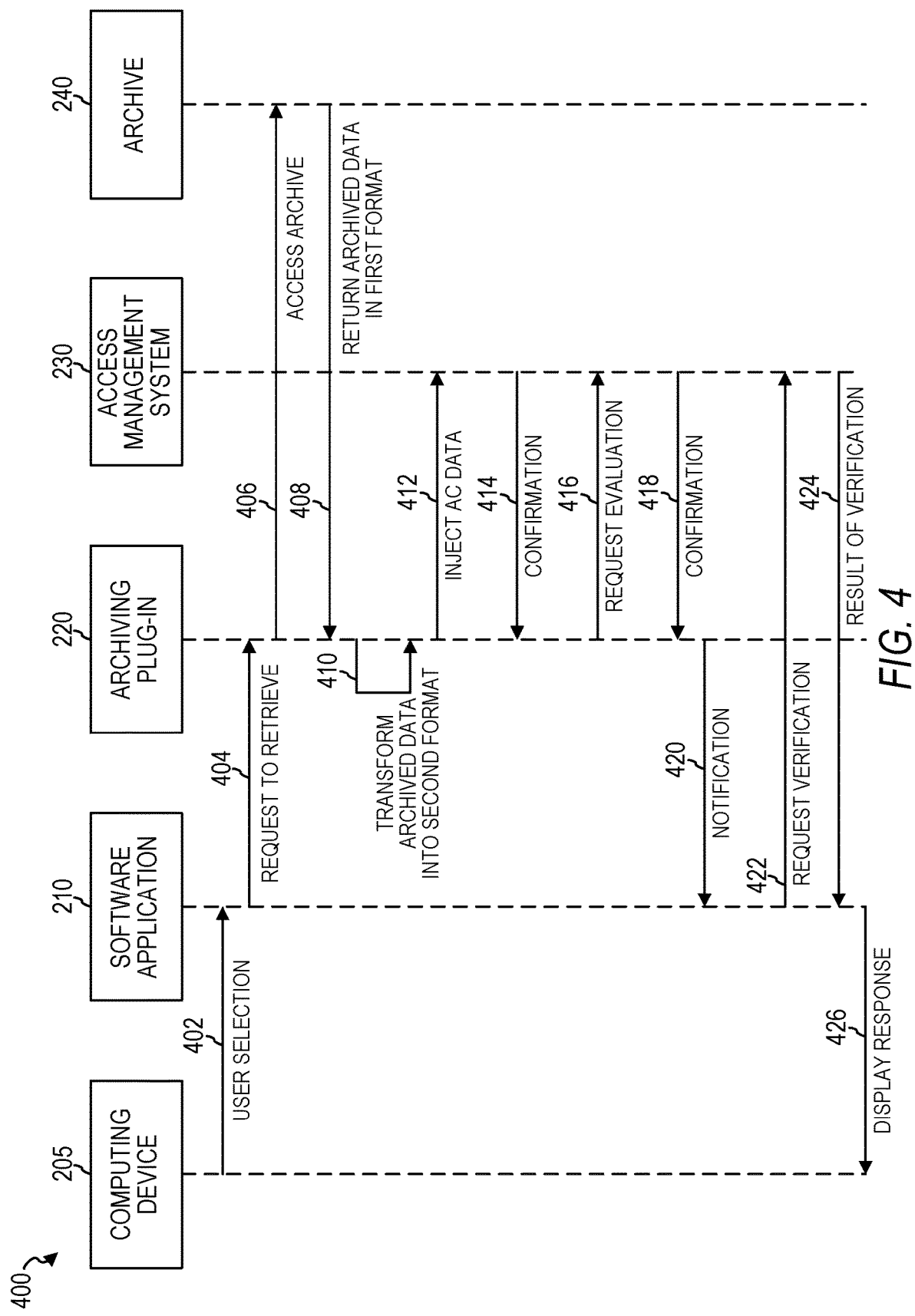
FIG. 4 is a sequence diagram illustrating yet another example method of implementing access control for archived objects.

FIG. 4 is a sequence diagram illustrating yet another example method 400 of enabling access control for archived objects. The method 400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 400 are performed by the archive access system 200 of FIG. 2 or any combination of one or more of its components (e.g., the software application 210, the archiving plug-in 220, the access management system 230, the archive 240).

At operation 402, the computing device 205 may send a user selection to the software application 210. The user selection may comprise a selection to retrieve archived data from the archive 240. For example, the user of the computing device 205 may have selected one or more indications of specific records of archived data presented as search results in a hit list on the computing device 205. In response to receiving the user selection from the computing device 205, the software application 210 may, at operation 404, send, to the archiving plug-in 220, a first request to retrieve the archived data indicated by the user selection from the archive 240. Next, in response to receiving the first request from the software application, the archiving plug-in 220 may attempt to access the archive 240 and obtain the archived data from the archive 240, at operation 406. At operation 408, the archive 240 may return the archived data requested by the archiving plug-in 220. The archive 240 may send the archived data to the archiving plug-in 220 in a first format. The first format of the archived data may comprise a BLOB format. However, other types of formats may be used for the first format of the archived data.

After receiving the archived data in the first format from the archive 240, the archiving plug-in 220 may, at operation 410, transform the obtained archived data from the first format into a second format. The second format of the archived data may comprise a corresponding format of an object created by the software application 210, such as XML. The object may correspond to the archived data. For example, the object may comprise the data that is archived.

At operation 412, the archiving plug-in 220 may inject access control data into the access management system 230. The access control data may be extracted by the archiving plug-in 220 from the archived data in the second format. The access control data may define one or more criteria for accessing the archived data. In some example embodiments, the one or more criteria may comprise one or more role-based criteria. However, other types of criteria are also within the scope of the present disclosure. The access management system 230 may receive the access control data and store it in a buffer, and then send a confirmation to the archiving plug-in 220 indicating such receipt, at operation 414. The archiving plug-in 220 may then, at operation 416, send, to the access management system 230, a second request to evaluate access rights of the user of the software application 210. The second request to evaluate access rights of the user of the software application 210 may comprise an identification of the user of the software application 210, as well as a credential of the user. At operation 418, the access management system 230 may evaluate the access rights of the user based on the request using the identification of the user, as well as a credential of the user, along with the access control data in the buffer of the access management system 230, and then send confirmation of such evaluation to the archiving plug-in 220.

At operation 420, the archiving plug-in 220 may, based on the access management system 230 evaluating the access rights of the user of the software application 210, send a notification including the archived data in the second format to the software application 210. For example, the archiving plug-in 220 may send the archived data in the second format to the software application 210 in response to receiving an indication that the access management system 230 has evaluated the access rights of the user, such as in response to receiving a message from the access management system 230 confirming that the evaluation is completed. Next, the software application 210 may, at operation 422, send, to the access management system 230, a third request to perform a verification of access rights to the archived data for the user of the software application 210. The software application 210 may send the third request to perform the verification of access rights to the access management system 230 in response to, or otherwise based on, receiving the archived data in the second format from the archiving plug-in 220. The access management system 230 may perform the requested verification and send the result of the requested verification to the software application 210, at operation 424. The result may indicate whether or not the user has permission to access the archived data.

At operation 426, the software application 210 may cause a response to the first request to be displayed on a computing device 205 of the user based on the result of the verification of access rights to the archived data for the user. In some example embodiments, the causing of the response to the first request to be displayed on the computing device 205 of the user may comprise causing the archived data in the second format to be displayed on the computing device 205 of the user based on the result of the verification of access rights comprising granting the user access to the archived data. In other example embodiments, the causing of the response to the first request to be displayed on the computing device 205 of the user may comprise causing an error message to be displayed on the computing device 205 of the user based on the result of the verification of access rights comprising denying the user access to the archived data.

It is contemplated that any of the other features described within the present disclosure can be incorporated into the method 400.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: receiving, from a software application, a first request to retrieve archived data from an archive, the first request being associated with a user of the software application; in response to the receiving of the first request, obtaining the archived data in a first format from the archive; transforming the obtained archived data from the first format into a second format; extracting access control data from the archived data in the second format, the access control data defining one or more criteria for accessing the archived data; injecting the access control data into an access management system, the access management system being configured to control access to non-archived data; subsequent to the injecting the access control data into the access management system, sending, to the access management system, a second request to evaluate access rights of the user of the software application; and based on the access management system evaluating the access rights of the user of the software application, sending the archived data in the second format to the software application.

Example 2 includes the computer-implemented method of example 1, further comprising: sending, by the software application to the access management system, a third request to perform a verification of access rights to the archived data for the user of the software application; receiving, by the software application from the access management system, a result of the verification of access rights to the archived data for the user of the software application; and causing, by the software application, a response to the first request to be displayed on a computing device of the user based on the result of the verification of access rights to the archived data for the user.

Example 3 includes the computer-implemented method of example 1 or example 2, wherein the causing the response to the first request to be displayed on the computing device of the user comprises causing the archived data in the second format to be displayed on the computing device of the user based on the result of the verification of access rights comprising granting the user access to the archived data.

Example 4 includes the computer-implemented method of any one of examples 1 to 3, wherein the causing the response to the first request to be displayed on the computing device of the user comprises causing an error message to be displayed on the computing device of the user based on the result of the verification of access rights comprising denying the user access to the archived data.

Example 5 includes the computer-implemented method of any one of examples 1 to 4, wherein the first format of the archived data comprises a binary large object (BLOB) format.

Example 6 includes the computer-implemented method of any one of examples 1 to 5, wherein the second format of the archived data comprises a corresponding format of an object created by the software application, the object corresponding to the archived data.

Example 7 includes the computer-implemented method of any one of examples 1 to 6, wherein the one or more criteria comprise one or more role-based criteria.

Example 8 includes the computer-implemented method of any one of examples 1 to 7, wherein the software application comprises an enterprise application.

Example 9 includes a system comprising: at least one processor; and a non-transitory computer-readable medium storing executable instructions that, when executed, cause the at least one processor to perform the method of any one of examples 1 to 8.

Example 10 includes a non-transitory machine-readable storage medium, tangibly embodying a set of instructions that, when executed by at least one processor, causes the at least one processor to perform the method of any one of examples 1 to 8.

Example 11 includes a machine-readable medium carrying a set of instructions that, when executed by at least one processor, causes the at least one processor to carry out the method of any one of examples 1 to 8.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 5:
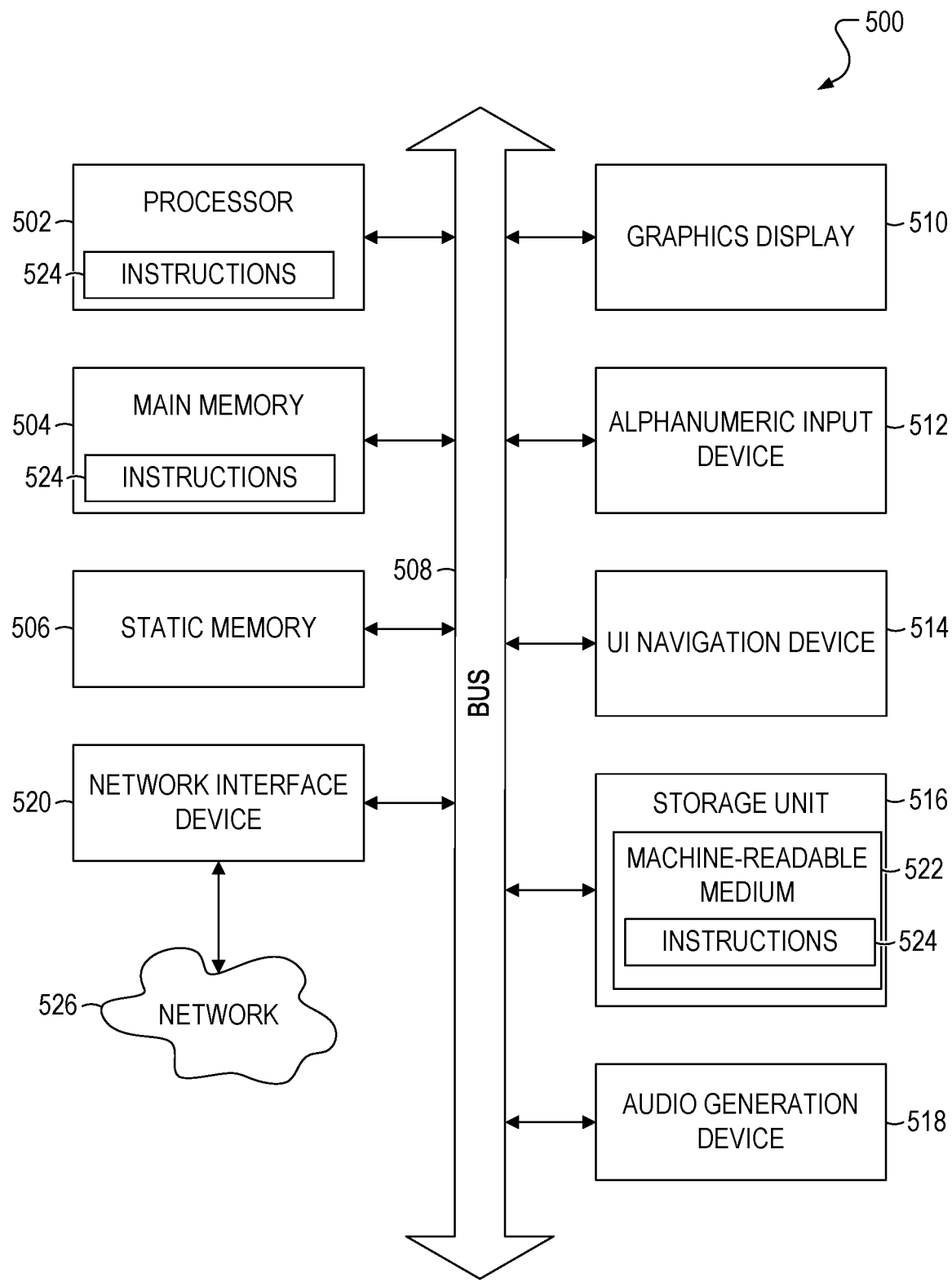
FIG. 5 is a block diagram of an example computer system on which methodologies described herein can be executed.

FIG. 5 is a block diagram of a machine in the example form of a computer system 500 within which instructions 524 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504, and a static memory 506, which communicate with each other via a bus 508. The computer system 500 may further include a graphics or video display unit 510 (e.g., a liquid crystal display (LCD) or a cathode ray tube (CRT)). The computer system 500 also includes an alphanumeric input device 512 (e.g., a keyboard), a user interface (UI) navigation (or cursor control) device 514 (e.g., a mouse), a storage unit (e.g., a disk drive unit) 516, an audio or signal generation device 518 (e.g., a speaker), and a network interface device 520.

The storage unit 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media. The instructions 524 may also reside, completely or at least partially, within the static memory 506.

While the machine-readable medium 522 is shown in an example embodiment to be a single medium, the term "machine-readable medium" may include a single medium or multiple media (e.g., a centralized or distributed database, and/or associated caches and servers) that store the one or more instructions 524 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
    receiving, from a software application, a first request to retrieve archived data from an archive, the first request being associated with a user of the software application;
    in response to the receiving of the first request, obtaining the archived data in a first format from the archive;
    transforming the obtained archived data from the first format into a second format;
    extracting access control data from the archived data in the second format, the access control data defining one or more criteria for accessing the archived data;
    injecting the access control data into an access management system, the access management system being configured to control access to non-archived data;
    subsequent to the injecting the access control data into the access management system, sending, to the access management system, a second request to evaluate access rights of the user of the software application; and
    based on the access management system evaluating the access rights of the user of the software application, sending the archived data in the second format to the software application.

2. The computer-implemented method of claim 1, further comprising:
    sending, by the software application to the access management system, a third request to perform a verification of access rights to the archived data for the user of the software application;
    receiving, by the software application from the access management system, a result of the verification of access rights to the archived data for the user of the software application; and
    causing, by the software application, a response to the first request to be displayed on a computing device of the user based on the result of the verification of access rights to the archived data for the user.

3. The computer-implemented method of claim 2, wherein the causing the response to the first request to be displayed on the computing device of the user comprises causing the archived data in the second format to be displayed on the computing device of the user based on the result of the verification of access rights comprising granting the user access to the archived data.

4. The computer-implemented method of claim 2, wherein the causing the response to the first request to be displayed on the computing device of the user comprises causing an error message to be displayed on the computing device of the user based on the result of the verification of access rights comprising denying the user access to the archived data.

5. The computer-implemented method of claim 1, wherein the first format of the archived data comprises a binary large object (BLOB) format.

6. The computer-implemented method of claim 1, wherein the second format of the archived data comprises a corresponding format of an object created by the software application, the object corresponding to the archived data.

7. The computer-implemented method of claim 1, wherein the one or more criteria comprise one or more role-based criteria.

8. The computer-implemented method of claim 1, wherein the software application comprises an enterprise application.

9. A system of comprising:
   at least one hardware processor; and
   a non-transitory computer-readable medium storing executable instructions that, when executed, cause the at least one hardware processor to perform computer operations comprising:
   receiving, from a software application, a first request to retrieve archived data from an archive, the first request being associated with a user of the software application;
   in response to the receiving of the first request, obtaining the archived data in a first format from the archive;
   transforming the obtained archived data from the first format into a second format;
   extracting access control data from the archived data in the second format, the access control data defining one or more criteria for accessing the archived data;
   injecting the access control data into an access management system to control access to non-archived data;
   subsequent to the injecting the access control data into the access management system, sending, to the access management system, a second request to evaluate access rights of the user of the software application; and
   based on the access management system evaluating the access rights of the user of the software application, sending the archived data in the second format to the software application.

10. The system of claim 9, wherein the computer operations further comprise:
    sending, by the software application to the access management system, a third request to perform a verification of access rights to the archived data for the user of the software application;
    receiving, by the software application from the access management system, a result of the verification of access rights to the archived data for the user of the software application; and
    causing, by the software application, a response to the first request to be displayed on a computing device of the user based on the result of the verification of access rights to the archived data for the user.

11. The system of claim 10, wherein the causing the response to the first request to be displayed on the computing device of the user comprises causing the archived data in the second format to be displayed on the computing device of the user based on the result of the verification of access rights comprising granting the user access to the archived data.

12. The system of claim 10, wherein the causing the response to the first request to be displayed on the computing device of the user comprises causing an error message to be displayed on the computing device of the user based on the result of the verification of access rights comprising denying the user access to the archived data.

13. The system of claim 9, wherein the first format of the archived data comprises a binary large object (BLOB) format.

14. The system of claim 9, wherein the second format of the archived data comprises a corresponding format of an object created by the software application, the object corresponding to the archived data.

15. The system of claim 9, wherein the one or more criteria comprise one or more role-based criteria.

16. The system of claim 9, wherein the software application comprises an enterprise application.

17. A non-transitory machine-readable storage medium tangibly embodying a set of instructions that, when executed by at least one hardware processor, causes the at least one processor to perform computer operations comprising:
    receiving, from a software application, a first request to retrieve archived data from an archive, the first request being associated with a user of the software application;
    in response to the receiving of the first request, obtaining the archived data in a first format from the archive;
    transforming the obtained archived data from the first format into a second format;
    extracting access control data from the archived data in the second format, the access control data defining one or more criteria for accessing the archived data;
    injecting the access control data into an access management system, the access management system being configured to control access to non-archived data;
    subsequent to the injecting the access control data into the access management system, sending, to the access management system, a second request to evaluate access rights of the user of the software application; and
    based on the access management system evaluating the access rights of the user of the software application, sending the archived data in the second format to the software application.

18. The non-transitory machine-readable storage medium of claim 17, wherein the computer operations further comprise:
    sending, by the software application to the access management system, a third request to perform a verification of access rights to the archived data for the user of the software application;
    receiving, by the software application from the access management system, a result of the verification of access rights to the archived data for the user of the software application; and
    causing, by the software application, a response to the first request to be displayed on a computing device of the user based on the result of the verification of access rights to the archived data for the user.

19. The non-transitory machine-readable storage medium of claim 18, wherein the causing the response to the first request to be displayed on the computing device of the user comprises causing the archived data in the second format to be displayed on the computing device of the user based on the result of the verification of access rights comprising granting the user access to the archived data.

20. The non-transitory machine-readable storage medium of claim 18, wherein the causing the response to the first request to be displayed on the computing device of the user comprises causing an error message to be displayed on the computing device of the user based on the result of the verification of access rights comprising denying the user access to the archived data.

* * * * *